United States Patent [19]

Neumann

[11] Patent Number: 5,598,825
[45] Date of Patent: Feb. 4, 1997

[54] ENGINE CONTROL UNIT

[75] Inventor: Barry R. Neumann, Hillarys, Australia

[73] Assignee: Transcom Gas Technologies Pty Ltd., Herdsman, Australia

[21] Appl. No.: 448,537

[22] PCT Filed: Dec. 14, 1993

[86] PCT No.: PCT/AU93/00649

§ 371 Date: Aug. 17, 1995

§ 102(e) Date: Aug. 17, 1995

[87] PCT Pub. No.: WO94/13946

PCT Pub. Date: Jun. 23, 1994

[30] Foreign Application Priority Data

Dec. 14, 1992 [AU] Australia .................................. PL6346

[51] Int. Cl.$^6$ .............................. F02D 19/02; F02D 23/02
[52] U.S. Cl. ............................ 123/478; 123/416; 123/527
[58] Field of Search ............................. 123/27 GE, 294, 123/357, 472, 478, 480, 527, 416, 417

[56] References Cited

U.S. PATENT DOCUMENTS 4,379,332  4/1983  Busser et al. ....................... 123/480 X
5,268,842 12/1993  Marston et al. ..................... 123/480 X
5,351,656 10/1994  Teramoto et al. .......................... 123/3

*Primary Examiner*—Tony M. Argenbright
*Attorney, Agent, or Firm*—Caesar, Rivise, Bernstein, Cohen & Pokotilow, Ltd.

[57] ABSTRACT

An engine control unit for a gas fuelled internal combustion engine detects engine speed, throttle position, manifold absolute pressure, gas pressure, gas temperature, battery voltage, air temperature, engine phase and boost pressure control valve feed back position. The control unit calculates a percentage full load value for the engine based upon the detected engine speed and throttle position and utilizes the calculated percentage full load value to calculate the injector on time for each gas injector in a gas delivery system for the engine. Typically, the control unit employs the percentage full load value and the engine speed to calculate a required manifold absolute pressure value, and this calculated manifold absolute pressure value may then be employed together with the percentage full load value to calculate a percent allowable load value. The engine control unit employs the percentage allowable load value to calculate injector on time and spark advance for the engine.

19 Claims, 8 Drawing Sheets

ENGINE CONTROL UNIT

FIELD OF THE INVENTION

The present invention relates to an Engine Control Unit (ECU) for a gas fuelled internal combustion engine, and relates particularly, though not exclusively, to an ECU for a spark ignition gas fuelled engine converted from a turbocharged diesel engine.

BACKGROUND TO THE INVENTION

In the prior art, naturally aspirated diesel engines have been converted to operate on a gaseous fuel, for example natural gas, using carburetted technology. However, problems have risen with the use of gas carburettors, particularly when using compressed natural gas (CNG) as a fuel. Furthermore, the advent of turbocharged diesel engines has created further difficulties for most engine converters as the engines are more highly stressed.

The temperature of natural gas after passing through the pressure regulators has been measured to be as low as $-40°$ C. when operating with fully charged CNG cylinders. Gas carburettors deliver fuel on a volume basis rather than a mass (or heat value) basis, and therefore there is a tendency for the carburettors to overfuel the engine. This characteristic affects both naturally aspirated and turbocharged engines with gas carburettors.

Problems also arise due to the design of the intake manifold and carburettor location which can result in some cylinders receiving more or less gas than other cylinders. This causes a tendency for some cylinders to detonate under certain load conditions. Attempts to control this by the use of detonation sensors have not been entirely successful.

A further problem with turbocharged engines is the inability to control the performance of the turbocharger since it is essentially a "free agent" which is not controlled directly by the throttle. Therefore it is also difficult to measure its performance and adjust the fuel flow and boost pressure accordingly.

The Engine Control Unit of the present invention was developed with a view to overcoming one or more of the above-noted problems in the prior art.

SUMMARY OF THE INVENTION

According to one aspect of the present invention there is provided a method of controlling the operation of a gas fuelled internal combustion engine, the engine having a gas injector for injecting gaseous fuel into each cylinder, the method comprising the steps of:

detecting the current throttle position of the engine;

calculating a percent full load value for the engine, based on said current throttle position; and, calculating an injector ON time for each cylinder based on said percent full load value whereby, in use, the correct amount of gaseous fuel can be injected into each cylinder responsive to the current throttle position to achieve optimal engine performance.

Typically the method also comprises detecting the current speed of the engine and employing the current engine speed in said step of calculating the percent full load value. Preferably the percent full load value is employed, together with the current engine speed, to calculate a required manifold pressure value. The calculated value of required manifold pressure may then be employed, together with the percent full load value, in calculating a percent allowable load value.

Advantageously the position of a manifold valve in the engine intake manifold is calculated for controlling manifold pressure based on said calculated percent full load value and detected engine speed. Advantageously a pressure detector is provided for detecting the actual manifold pressure. If the engine is a turbocharged engine the position of a boost pressure control valve is preferably controlled based on a comparison of said calculated value of the required manifold pressure with the detected actual manifold pressure. Typically both said required and actual manifold pressure are absolute pressure values.

According to another aspect of the present invention there is provided an engine control unit for controlling the operation of a gas fuelled internal combustion engine, the engine having a gas injector for injecting gaseous fuel into each cylinder, the system comprising:

throttle position detector means for detecting the current throttle position of the engine;

processor means for calculating a percent full load value for the engine based On said current throttle position, and for calculating an injector ON time for each cylinder based on said percent full load value whereby, in use, the correct amount of gaseous fuel can be injected into each cylinder responsive to the current throttle position to achieve optimum engine performance.

Typically the system further comprises speed detector means for detecting the current speed of the engine, and said processor means also employs current engine speed to calculate said percent full load value. Preferably said percent full load value is employed, together with the engine speed, to calculate a required manifold absolute pressure value.

Typically the system further comprises gas pressure and gas temperature detectors for detecting the pressure and temperature of gaseous fuel delivered to the engine respectively, and said processor means employs the detected gas pressure and temperature in calculating the injector ON time.

BRIEF DESCRIPTION OF THE DRAWINGS

In order to facilitate a better understanding of the nature of the invention a preferred embodiment of the ECU will now be described, by way of example only, with reference to the accompanying drawings, in which.

DETAILED DESCRIPTION OF PREFERRED EMBODIMENT

Figure 1:
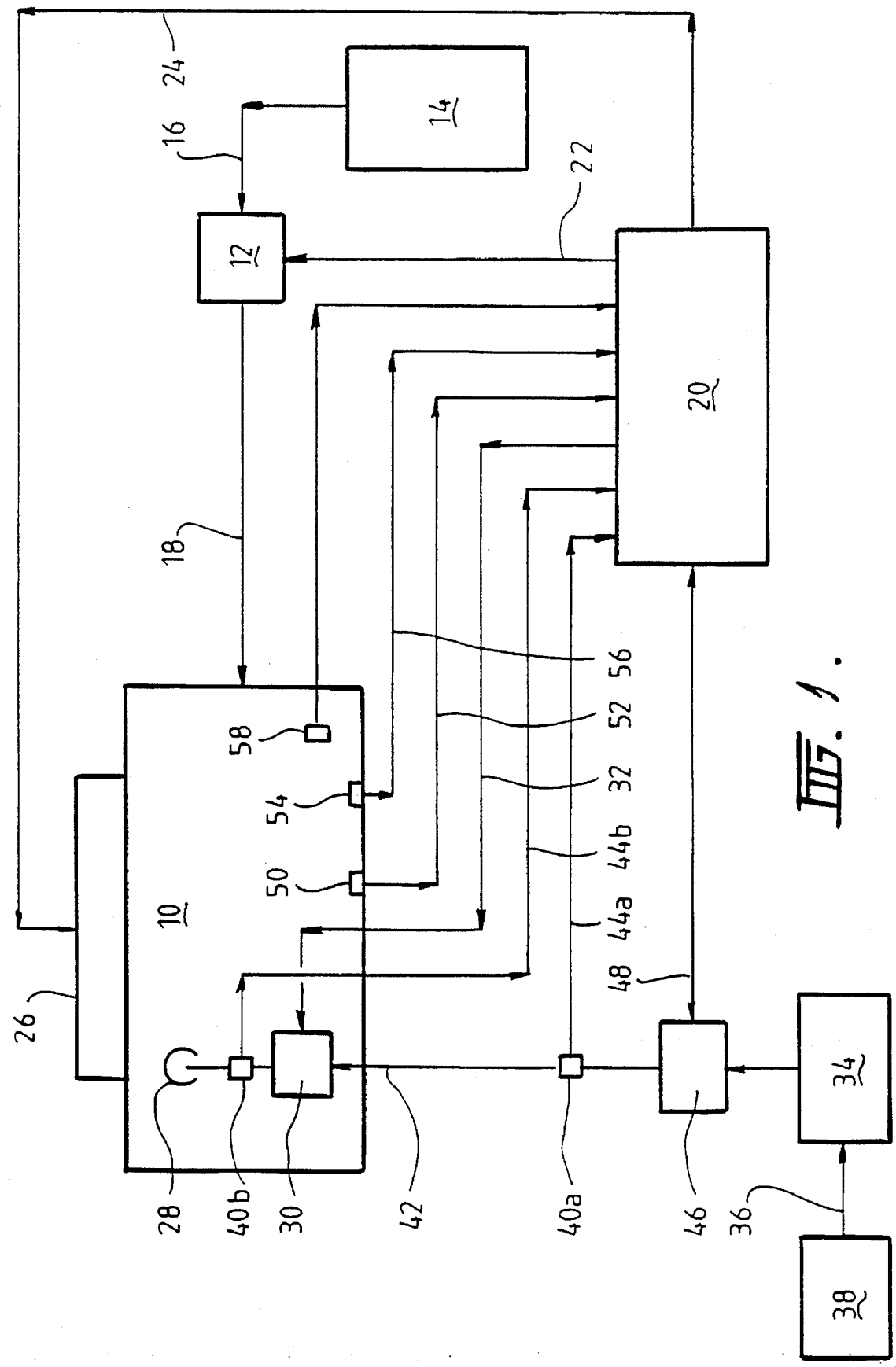
FIG. 1 is a functional block diagram of a gas fuelled internal combustion engine to which an embodiment of the ECU of the present invention is applied.

Referring to FIG. 1, a spark ignited internal combustion engine is illustrated diagrammatically at 10. The engine 10 is capable of operating on a gaseous fuel, and is provided with a gas delivery system 12 for controlling the delivery of gaseous fuel from a gas reservoir 14, via a gas delivery line 16 to a fuel inlet 18 of the engine. The gas delivery system 12 typically comprises individual solenoid operated gas injectors (not illustrated) for each cylinder of the engine. Gas delivery system 12 is under the control of an Engine Control Unit controller 20 via control line 22. The gas injectors of the gas delivery system 12 inject gas sequentially to the engine, each injector delivering gas during the intake stroke of it's respective cylinder. The Engine Control Unit (ECU) controller 20 delivers a signal via ignition control line 24 to a spark ignition system 26, which causes the fuel introduced into the engine, along with air, to be ignited and hence provide the power stroke of each cylinder.

Air to support combustion is delivered to the engine 10 through air inlet 28, for example, the inlet manifold of the engine, via air throttle means 30. Air throttle means 30 may comprise, for example, a manifold valve which is also under the control of the ECU controller 20 via manifold valve control line 32, for controlling the manifold absolute pressure. It may also be desirable to have some form of feedback means provided (not illustrated) for the manifold valve to provide a feedback signal to the ECU controller 20, indicative of an operating position of the manifold valve.

Air is delivered to inlet 28 via the manifold valve 30 from a turbocharger 34. Air at ambient pressure is supplied to the turbocharger 34 through an air delivery line 36 from an air filter 38, which is open to atmosphere. Turbocharger 34 boosts the pressure of air delivered to the engine 10 via manifold valve 30, above an ambient pressure. Sensor 40a senses the air temperature in the boost air delivery line 42 and provides a feedback signal indicative of the temperature to the ECU controller 20 via control line 44a. Sensor 40b senses the actual manifold air pressure (MAP) and provides a feedback signal indicative of the MAP to the ECU controller 20 via control line 44b.

A boost pressure control valve 46 is provided in the boost air delivery line 42 for controlling the boost pressure of air delivered to the engine 10. The boost pressure control valve 46 is directed to control boost pressures under the control of ECU controller 20 via boost pressure control line 48. The boost pressure control valve 46 is typically provided with feedback means for providing a feedback signal to the ECU controller 20, indicative of an operating condition of the boost pressure control valve 46.

In this embodiment, the primary inputs to the ECU controller 20 are engine speed and throttle position. Engine speed is detected by a sensor 50 which generates a signal indicative of the engine speed on input line 52 to the ECU controller 20. Sensor 50 is typically an inductive (magnet and coil) sensor positioned adjacent to the ring gear teeth of the fly wheel of the engine 10. The sensor produces a sinusoidal wave form having voltage and frequency characteristics that vary with the engine speed. The actual engine speed is calculated by ECU controller 20 by measuring the time between a fixed number of peaks and troughs in the wave form.

Throttle position is measured by a throttle position sensor 54 which provides an electrical signal indicative of the throttle position on input line 56 to the ECU controller 20. The throttle position sensor 54 in this embodiment comprises a potentiometer "geometrically" coupled to the throttle/accelerator pedal linkage. Typically, 0.0 Volts equates to zero position, whilst 5.0 Volts equates to maximum throttle position.

In the illustrated embodiment the engine 10 is a six cylinder engine provided with three ignition coils (three coil pack, in which each coil fires two plugs simultaneously). A timing pulse is generated by a timing or engine phase sensor 58 mounted on the engine every second revolution of the engine. Fly wheel teeth signals from the engine speed sensor 50 are modified by a phase locked loop circuit which multiplies the signal frequency by twelve. In this way two revolutions of the engine can always be divided up into six intervals of equal angular displacement. Since the actual physical location of the timing sensor 58 is known, it is possible to nominate ignition timings in the standard units of ° Crank Angle Before. Top Dead Centre. In this embodiment the ECU controller 20 also uses the $1/12$ of a flywheel tooth interval (approximately 0.2°) as the increment by which spark advance may be varied.

The ECU controller 20 typically comprises a microprocessor based control system, having analogue to digital converters (ADC) for converting the analogue signals from sensors 40a, 40b, 50 and 54, as well as the feedback signal from the boost pressure control valve 46, into a digital format. Digital signals are employed to provide suitable control signals for controlling the manifold valve position, boost pressure control valve position and the operation of the gas delivery system 12 and spark ignition system 26. ECU controller 20 also comprises suitable read only memory (ROM) devices for storing look-up tables of engine operating parameters, employed by the ECU controller 20 to achieve optimum engine performance. The programmable nature of the ECU controller 20 means that it can be readily modified to suit different engines, and provides complete freedom in setting engine performance characteristics. As the engine is fully under the control of the Engine Control Unit responsive to engine speed and throttle position as set by the driver (assuming the engine is a vehicle engine), the vehicle can effectively be under "drive-by-wire" control.

A method of controlling the operation of the gas fuelled internal combustion engine 10, employing the Engine Control Unit described above, will now be described in detail with reference to FIG. 2.

Figure 2:
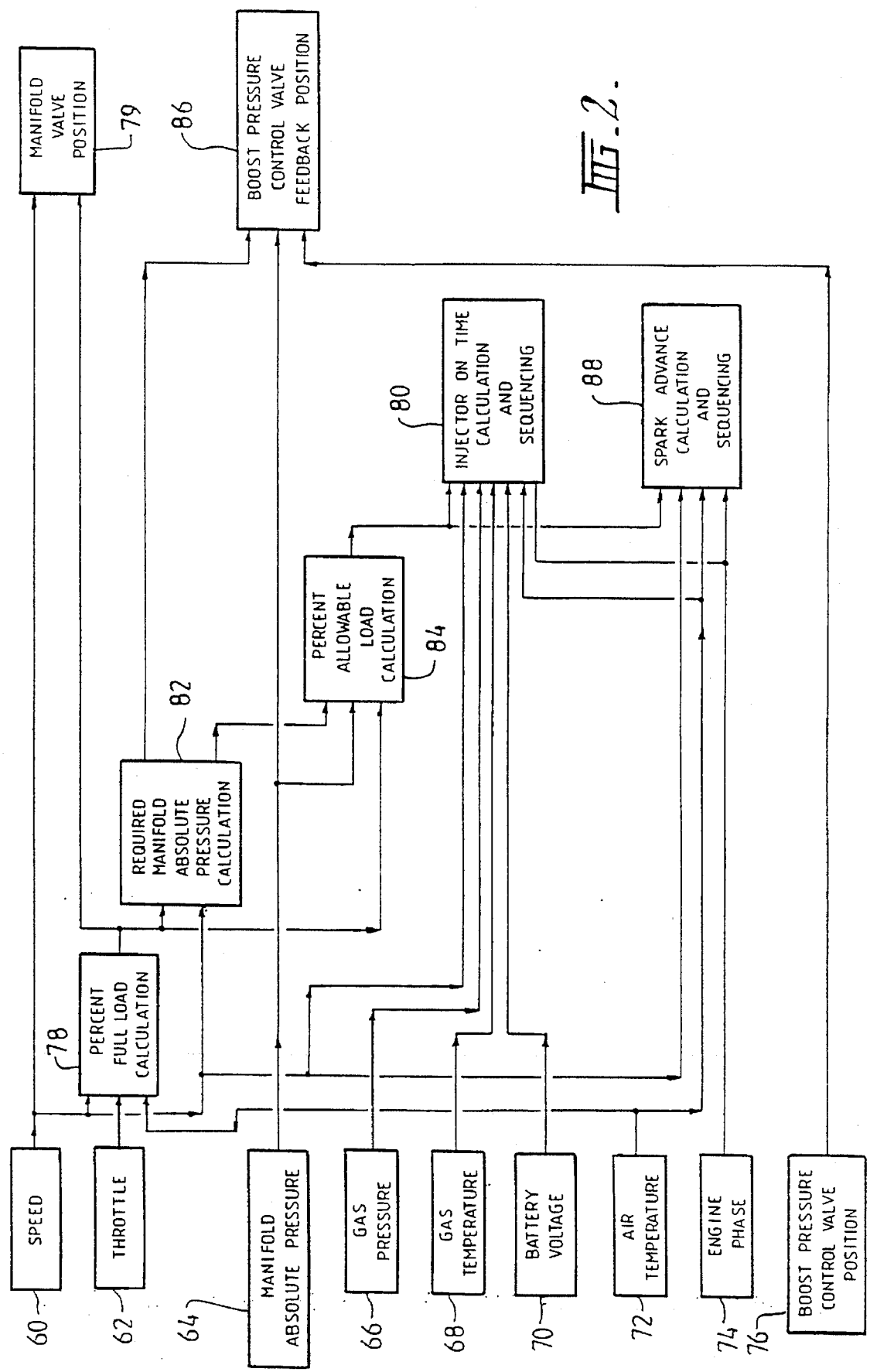
FIG. 2 is a flow chart illustrating the operation of a preferred embodiment of the ECU according to the invention.
Figure 8:
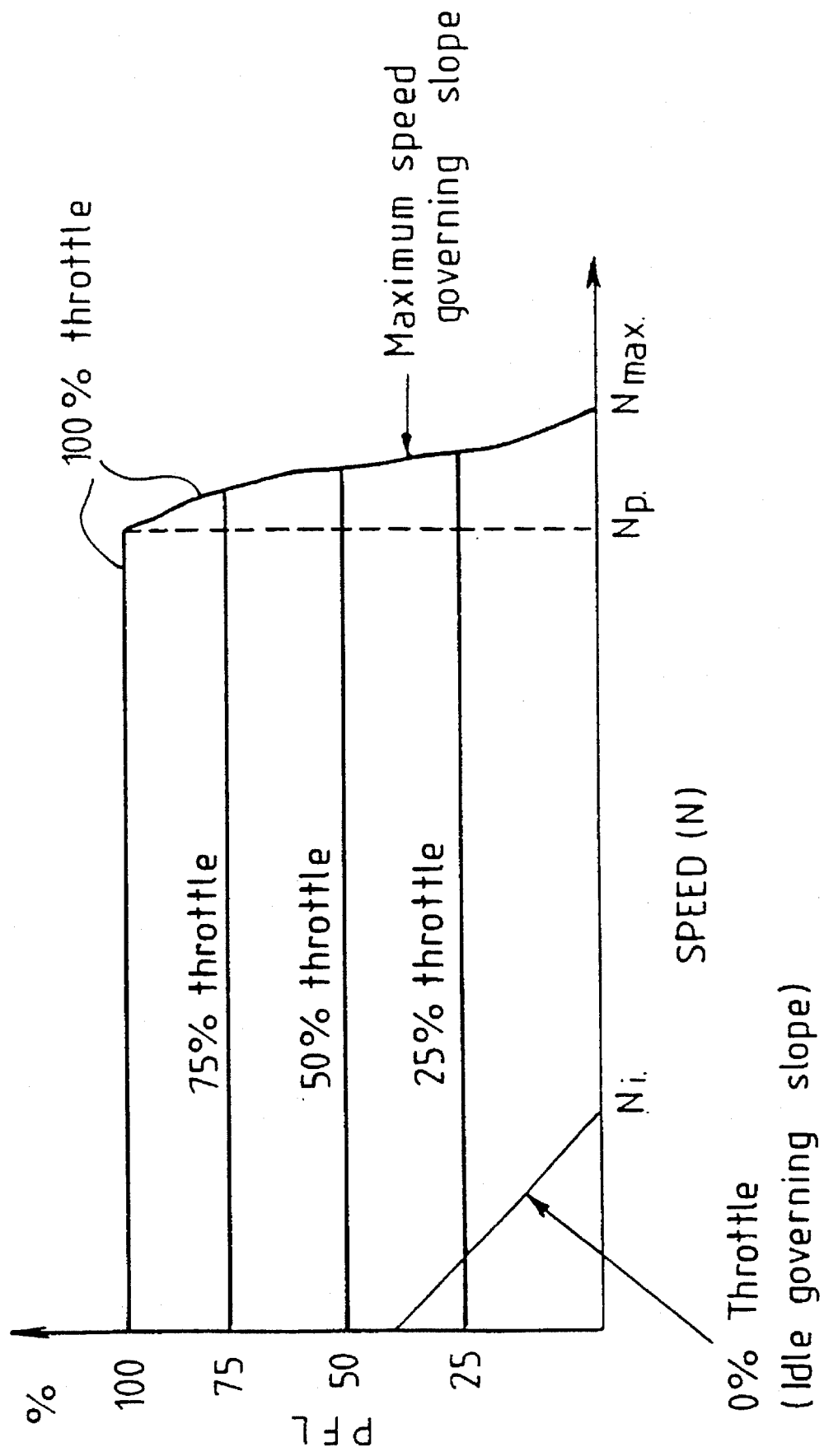

On the left hand side of the flow chart of FIG. 2 each of the engine operating parameters detected by the Engine Control Unit described above are listed, namely, engine speed 60, throttle position 62, manifold absolute pressure (MAP) 64, gas pressure 66, gas temperature 68, battery voltage 70, air temperature 72, engine phase 74 and boost pressure control valve (BPCV) feed back position 76. Each of these parameters is provided as an input in the form of an electrical signal to the ECU controller 20 of FIG. 1, for controlling the operation of the gas fuelled internal combustion engine 10. ECU controller 20 typically employs the detected engine speed 60 and throttle position 62 to calculate a percentage full load (PFL) value for the engine. PFL is a non-dimensional measure of the load or torque produced by or required from the engine. It is generally directly proportional to throttle position, except in the governing regions of the load/speed envelope, where speed is controlled (see FIG. 8). PFL effectively indicates the value of the load required from the engine as a percentage of the full load for a particular engine speed. It provides a way of determining the load required from or produced by the engine without having to measure or calculate the actual load, which is difficult in an on-road situation. Since PFL is non-dimensional, the absolute load value is not required and therefore the system can be applied to any engine. PFL is calculated as follows:

If throttle=0%, and speed is $<N_i$, then PFL=K $(N_i-N)$, if speed is $>N_i$, then PFL=0

If throttle is >0%, $$PFL = \text{least of } \frac{N_{max} - N}{N_{max} - N_p} \times 100\% \text{ \& throttle \%}$$

Where

Figure 4:
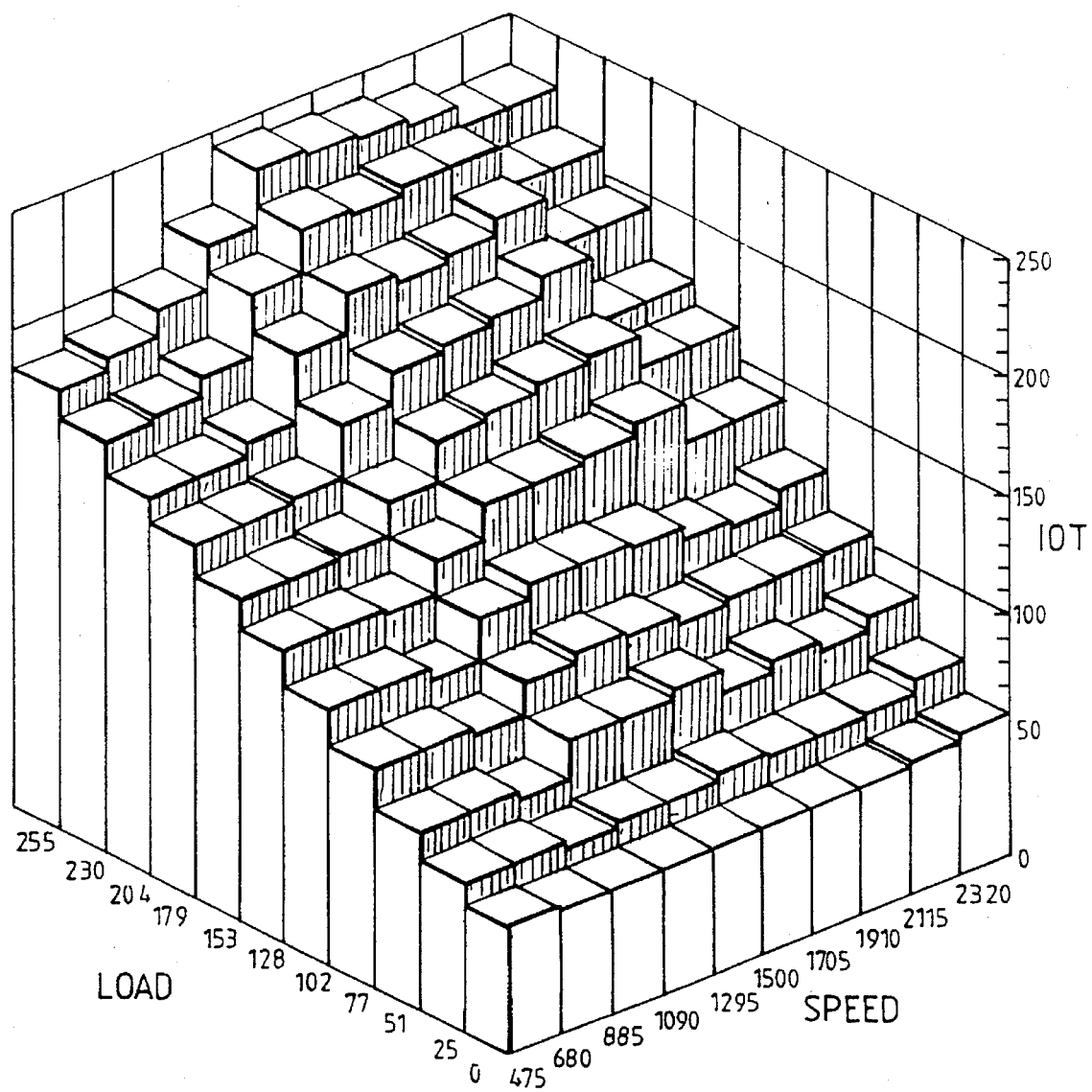
FIG. 4 is a three-dimensional chart which illustrates the variation in Injector On Time (IOT) as controlled by the preferred embodiment of the ECU according to the invention.

N=engine speed $N_i$=engine idle speed $N_{max}$=maximum engine speed in governing region $N_p$=maximum power engine speed K=idle governing slope PFL may also be adjusted to reduce engine output if the air inlet temperature goes too high, for example, due to a blocked intercooler (a heat rejection device located between the turbocharger air outlet and the intake manifold). PFL may be reduced, for example, as follows:

| Air Temp. | 30° C. | 40° C. | 50° C. | 60° C. | 70° C. | 80° C. | 90° C. |
|---|---|---|---|---|---|---|---|
| Max Allowable PFL | 100 | 100 | 97 | 94 | 90 | 86 | 82 | the ECU controller 20 to calculate the injector On time (IOT) for each gas injector in the gas delivery system 12. IOT is looked up in a look-up table stored in ECU controller 20, as a function of engine speed and load (PFL). IOT is determined empirically across the full range of engine speeds and PFL by testing the engine in a test bed to produce the desired output across the speed-load (PFL) envelope. The values for IOT are then stored in a ROM in the form of a look-up table. FIG. 4 is a three dimensional representation of the typical variation in IOT across the speed-load envelope of the engine of the described embodiment.

ECU controller 20 also adjusts the timing of injector ON time (IOT) as the engine speed increases, ie., the centre line of injection angle (IOT converted to angle) is advanced as engine speed rises. This adjustment is made to take into consideration the nominal opening time (ie., in which no gas flows) of the injector and the transport time to get gas from the injector to the inlet port. Again $\frac{1}{12}$ of a flywheel tooth is used by the ECU controller as the increment by which the centre line of injection angle is varied.

Figure 5:
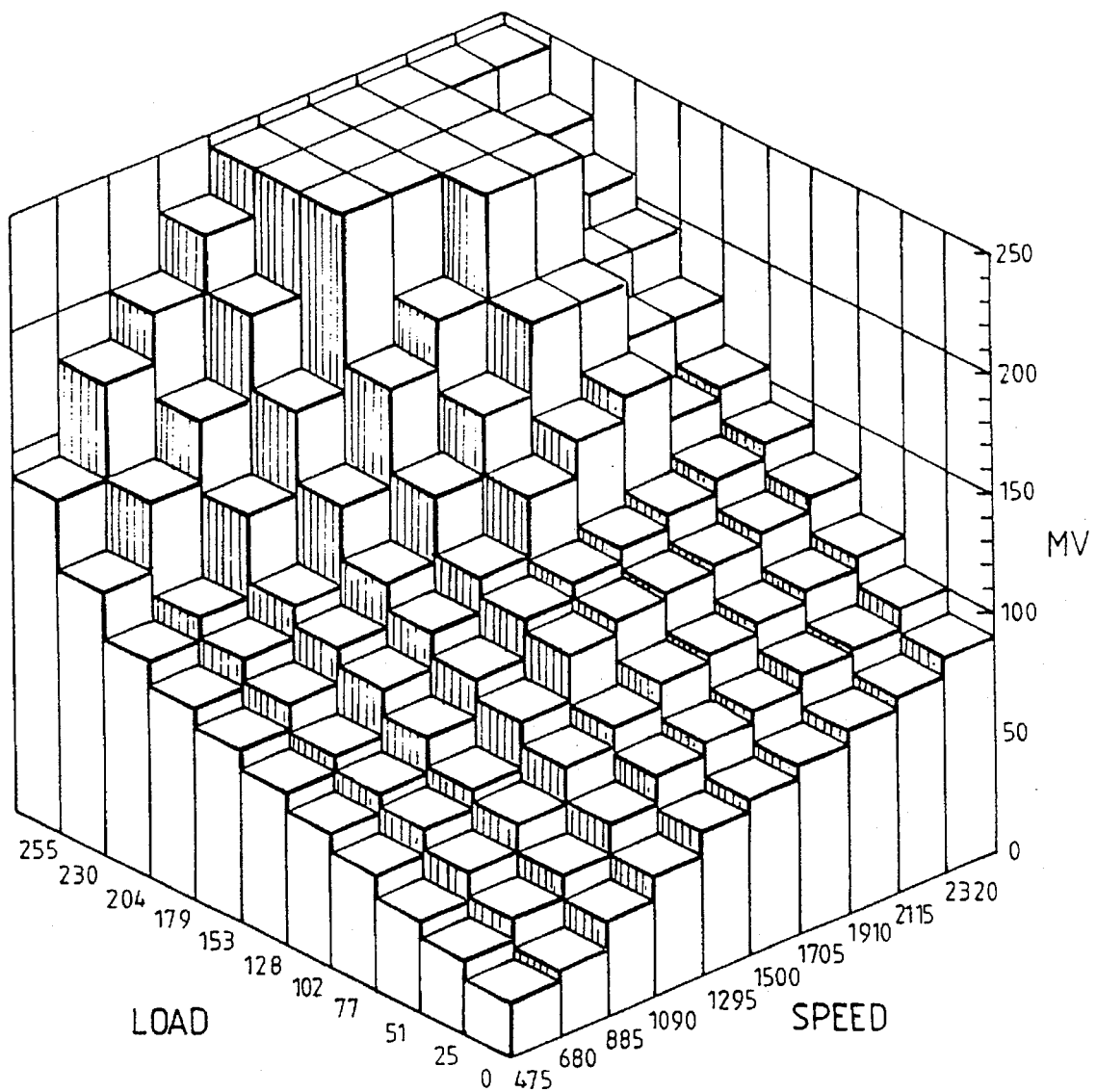
FIG. 5 is a three-dimensional chart which illustrates the variation in Manifold Valve (MV) position as controlled by the ECU.

The detected current engine speed 60 and the PFL calculation 78 may also be employed to calculate the manifold valve (MV) position of the intake manifold valve 30 of the engine. MV is also established during engine testing across the speed-load envelope, and the values stored in a ROM in the form of a look-up table. FIG. 5 illustrates in three dimensional form the variation of MV across the speed-load envelope of the engine 10. MV is looked up by ECU controller 20 as a function of engine speed and PFL. PFL is used since it ensures the manifold valve is opened as early as possible during transients, which demand high loads. If some form of feedback means is provided in connection with the manifold valve, to provide a feedback signal to the ECU controller, the position of the manifold valve can be even more accurately controlled. Such feedback means may include, for example, a position sensor connected to the manifold valve, or the actual MAP may be employed to provide an indication to the ECU controller of the position of the manifold valve. This would avoid the need to establish the position of manifold valve at start-up by moving the valve to its fully open and fully closed position.

Figure 6:
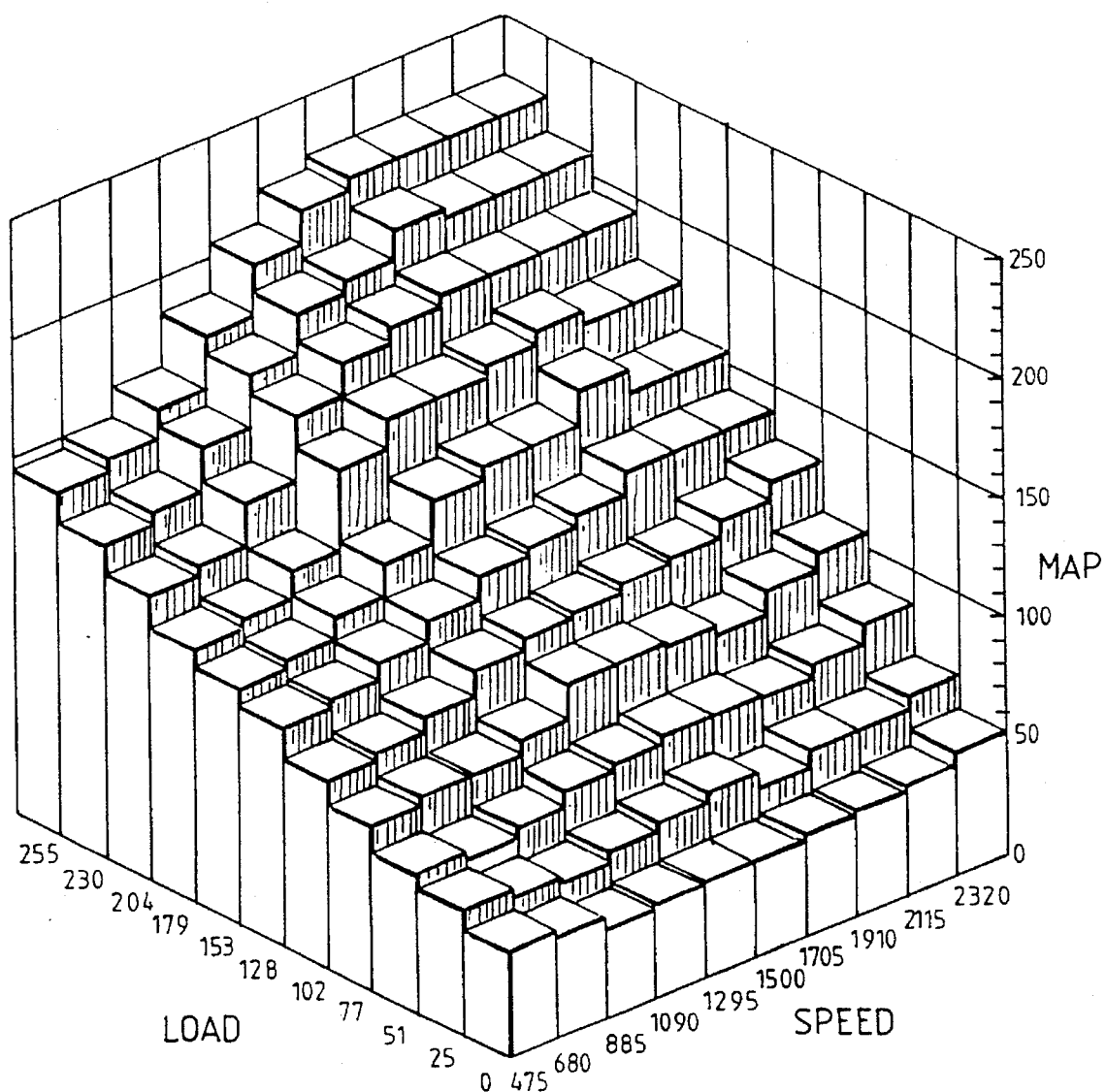
FIG. 6 is a three-dimensional chart which illustrates the variation in Manifold Absolute Pressure (MAP) position as controlled by the ECU.

The current engine speed 60 and PFL calculation 78 may also be employed by ECU controller 20 to calculate the required manifold absolute pressure (MAP) in the intake manifold of the engine 10. The required MAP is determined empirically by experimentation/design as a function of engine speed and PFL, to enable sufficient engine output to be achieved. For high engine output/torque a high MAP is required, conversely for low engine output a low MAP is required. The required MAP values are also stored in a ROM in the form of a look-up table, which is referenced by ECU controller 20 to calculate the required MAP based on detected current engine speed 60 and calculated PFL 78. FIG. 6 illustrates in three dimensional form the variation in required MAP across the speed-load envelope of the engine 10.

If the engine 10 is turbocharged, as in the above described embodiment, the required MAP 82 is compared with the actual MAP 64, and after allowing for an offset to allow for zero load MAP, a percent allowable load (PAL) is calculated at 84. PAL is required in the case of turbocharged engines to prevent excess fuelling, as would occur if the gas delivery was only controlled by PFL. During transients some lag occurs as the engine accelerates, since the turbocharger requires some time to accelerate to the new operating state and to develop the required MAP/boost pressure. PAL is calculated as follows:

$$PAL = \left( \frac{\text{actual } MAP - \text{minimum } MAP}{\text{required } MAP - \text{minimum } MAP} \right) \times PFL$$

wherein minimum MAP=representative value of MAP at PFL=0, and the term in brackets is clipped to be $\leq 1.00$.

Typically, the calculated PAL 84 is used together with the current engine speed 60 to look up the IOT from the IOT look-up table, rather than the calculated PFL 78 directly.

If the actual MAP exceeds atmospheric pressure and is higher than the required MAP, the boost pressure control valve (BPCV) is actuated to control the pressure, ie., the BPCV is opened to lower the boost pressure. Conversely, the BPCV is closed if the actual MAP is less than the desired MAP. The BPCV feedback signal 76 is employed by the ECU controller 20 to check correct BPCV operation. The actual position of the BPCV is not used in a control sense, but is used to check that the valve has moved a discreet amount when commanded to move by ECU controller 20. If not, a fault is registered which indicates that the BPCV requires checking and/or servicing.

IOT is calculated at 80 using the detected current engine speed 60 and the calculated PAL 84 for reference conditions of air temperature (AT) 72, gas pressure (GP) 66, gas temperature (GT) 68 and battery voltage (BV) 70. If the detected values of these operating parameters differ from the reference settings, corrective action is instigated by ECU controller 20 to alter the IOT and hence the amount of gas otherwise delivered to the engine. In particular, if the air temperature rises above it's reference set point, the mass of gas injected into the engine is reduced by 0.5% for each 3° C. rise above the reference temperature (e.g. 298° K.). To cater for variations in gas pressure and temperature which effect gas density and sonic velocity in the orifice of a gas injector, the following correction is applied to the effective injector on time:

$$IOTE = IOTE_R \times \frac{GP_R}{GP} \times \frac{GT}{GT_R} \times \frac{\sqrt{GT_R}}{\sqrt{GT}} \times \left[1 - \frac{\left(1 - \frac{AT_R}{AT}\right)}{2}\right]$$

where, $IOTE_R$=injector ON time effective reference=IOT–injector opening time at reference battery voltage.

$GP_R$=reference gas pressure $GT_R$=reference gas temperature $AT_R$=reference air temperature, and $AT \geq AT_R$.

$GT_R$ is typically set at 15° C., which coincides with gas industry standards for the measurement of gaseous fuel properties. It is also in approximately the middle of the range for measurement of the actual gas temperatures. $GP_R$ depends on the gas injectors employed, and the trade-off between having a low gas pressure but long ON time and a higher gas pressure with shorter ON time. $GP_R$ is typically in the range of 700 to 800 kPa Gauge. A gas injector takes a discrete interval of time to open, depending on the available battery voltage (BV) and the gas pressure (GP). The $IOTE_R$ is therefore indicative of the "flowing" time the gas injector experiences and is therefore the IOT value that adjustments are made to for gas pressure and temperature variations to obtain the effective injector ON time (IOTE).

Figure 7:
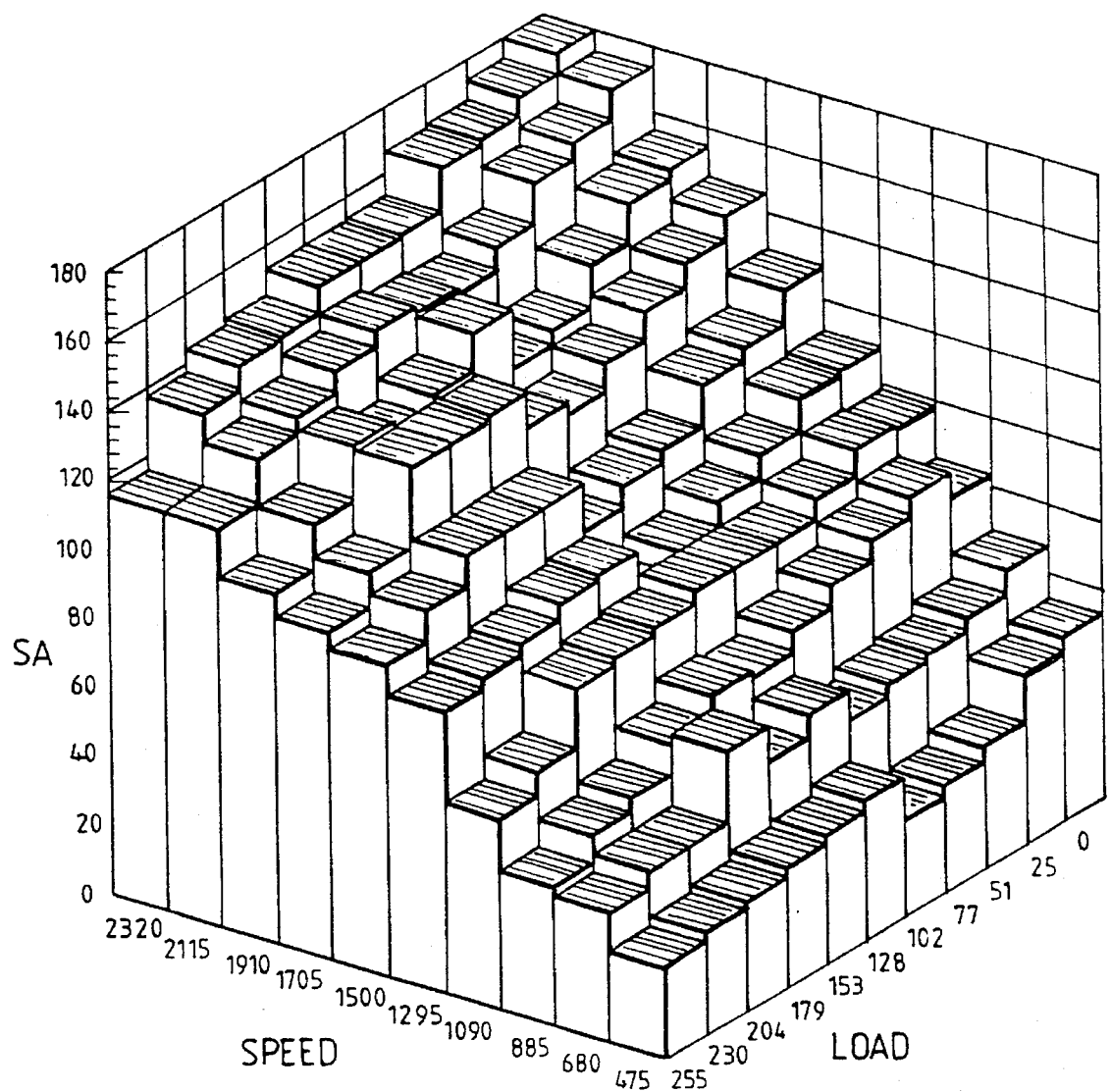
FIG. 7 is a three-dimensional chart which illustrates the variation in Spark Advance (SA) as controlled by the ECU; and, FIG. 8 is a graphical representation of a typical Percent Full Load (PFL) vs. Speed curve for an engine.

The detected current engine speed 60 and calculated PAL 84 are also employed by ECU controller 20 to calculate the spark advance (SA) 88 for the reference air temperature 72. SA is also calculated by reference to a look-up table stored in ECU controller 20. FIG. 7 illustrates in three dimensional form the variation in SA across the speed-load envelope. In each of FIGS. 4, 5, 6 and 7 all the values indicated are non-dimensional digital values used by the software resident in the ECU controller 20, with the exception of engine speed which is in units of RPM. SA is also determined by testing the particular engine for which the Engine Control Unit is designed. SA is required due to the small delay (order 2 milliseconds) which occurs before combustion starts after the initiation of a spark. This delay varies with changes in air temperature 72 and gas/air ratio. The higher the air temperature, the less delay and conversely for lower air temperatures. Therefore, an adjustment is made to the value of SA derived from the look-up table based on the detected air temperature 72. An engine phase marker 74 (or timing signal) is used as the datum for setting SA. The engine phase marker 74 is also employed to set the timing for the correct sequencing 80 of the gas injectors.

Figure 3:
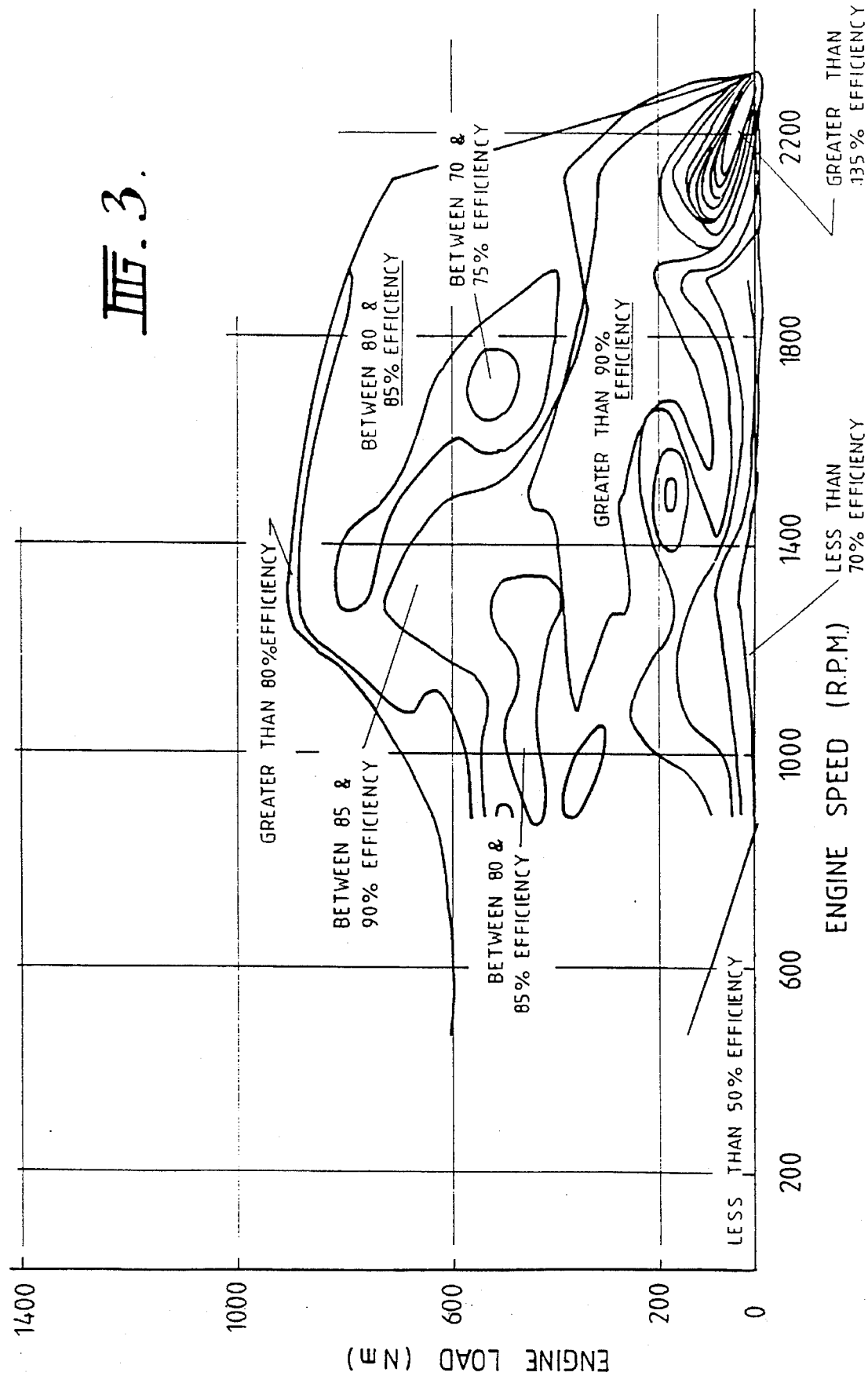
FIG. 3 illustrates graphically the relative efficiency of a converted diesel engine employing an ECU according to the invention, compared with the original diesel engine performance as a function of load and engine speed.

Now that the operation of the preferred embodiment of the Engine Control Unit according to the invention has been described in detail, it will be apparent that the system has significant advantages over prior art systems for controlling the operation of gas fuelled internal combustion engines. In particular, by employing gas injectors and accurately calculating the injector ON time the correct amount of gaseous fuel can be injected into each cylinder to achieve optimum engine performance under the full range of engine speed and load conditions. Thus overfuelling can be avoided and significant fuel economies achieved, FIG. 3 illustrates graphically the relative efficiency of a converted diesel engine employing an Engine Control Unit according to the invention, compared with the original diesel engine performance as a function of engine load and speed. From FIG. 3 it can be seen that the converted engine achieves better than 80% relative efficiency over most of the speed-load envelope, and greater than 90% relative efficiency at engine loads below 300 Nm.

Numerous variations and modifications will suggest themselves to persons skilled in the mechanical engineering arts, in addition to those already described, without departing from the basic inventive concepts. For example, the Engine Control Unit according to the invention is also applicable to a gas fuelled internal combustion engine which is not turbocharged. The system and method according to the invention are also applicable with suitable modifications to dual fuelled engines. All such variations and modifications are to be considered within the scope of the present invention, the nature of which is to be determined from the foregoing description and the appended claims.

I claim:

1. A method of controlling the operation of a gas fuelled internal combustion engine, the engine having a gas injector for injecting gaseous fuel into each cylinder, the method comprising the steps of:

detecting the current throttle position of the engine;

calculating a percent full load value for the engine, based on said current throttle position; and, calculating an injector ON time for each cylinder based on said percent full load value whereby, in use, the correct amount of gaseous fuel can be injected into each cylinder responsive to the current throttle position to achieve optimal engine performance.

2. A method of controlling the operation of a gas fuelled internal combustion engine as claimed in claim 1, further comprising the step of detecting the current speed of the engine and employing the current engine speed in said step of calculating the percent full load value.

3. A method of controlling the operation of a gas fuelled internal combustion engine as claimed in claim 2, wherein the percent full load (PFL) value for the engine is calculated as follows:

If throttle=0%, and speed is <$N_i$, then PFL=K ($N_i$−N), if speed is >$N_i$, then PFL=0.

If throttle is >0%, $$PFL = \text{least of } \frac{N_{max} - N}{N_{max} - N_p} \times 100\% \text{ \& throttle } \%$$

Where

N=engine speed $N_i$=engine idle speed $N_{max}$=maximum engine speed in governing region $N_p$=maximum power engine speed K=idle, governing slope.

4. A method of controlling the operation of a gas fuelled internal combustion engine as claimed in claim 3, wherein the percent full load value is employed, together with the current engine speed, to calculate a required manifold absolute pressure value.

5. A method of controlling the operation of a gas fuelled internal combustion engine as claimed in claim 4, further comprising the step of calculating a percent allowable load (PAL) value based on the calculated values of the required manifold absolute pressure (MAP) and the PFL.

6. A method of controlling the operation of a gas fuelled internal combustion engine as claimed in claim 5, wherein the percent allowable load (PAL) value for the engine is calculated as follows:

$$PAL = \left( \frac{\text{actual } MAP - \text{minimum } MAP}{\text{required } MAP - \text{minimum } MAP} \right) \times PFL$$

wherein minimum MAP=representative value of MAP at PFL=0, and the term in brackets is clipped to be $\leq 1.00$.

7. A method of controlling the operation of a gas fuelled internal combustion engine as claimed in claim 6, the injector ON time (IOT) is calculated using the calculated value of PAL and the current engine speed.

8. A method of controlling the operation of a gas fuelled internal combustion engine as claimed in any one of claims 1 to 7, wherein the injector ON time (IOT) is corrected for variations from reference conditions of air temperature (AT), gas pressure (GP), gas temperature (GT) and battery voltage (BV) to obtain an effective injector ON time (IOTE) as follows:

$$IOTE = IOTE_R \times \frac{GP_R}{GP} \times \frac{GT}{GT_R} \times \frac{\sqrt{GT_R}}{\sqrt{GT}} \times \left[ 1 - \frac{\left(1 - \frac{AT_R}{AT}\right)}{2} \right]$$

where, $IOTE_R$=injector ON time effective reference=IOT−injector opening time at reference battery voltage.

$GP_R$=reference gas pressure $GT_R$=reference gas temperature $AT_R$=reference air temperature, and $AT \geq AT_R$.

9. A method of controlling the operation of a gas fuelled internal combustion engine as claimed in claim 4, wherein the position of a manifold valve in the engine intake manifold is calculated for controlling manifold pressure based on said calculated percent full load value and detected engine speed, and wherein a pressure detector is provided for detecting the actual manifold absolute pressure.

10. A method of controlling the operation of a gas fuelled internal combustion engine as claimed in claim 9, wherein the engine is a turbocharged engine and the position of a boost pressure control valve is controlled based on a comparison of said calculated value of the required manifold absolute pressure with the detected actual manifold absolute pressure.

11. An engine control unit for controlling the operation of a gas fuelled internal combustion engine, the engine having a gas injector for injecting gaseous fuel into each cylinder, the system comprising:

throttle position detector means for detecting the current throttle position of the engine;

processor means for calculating a percent full load value for the engine based on said current throttle position, and for calculating an injector ON time for each cylinder based on said percent full load value whereby, in use, the correct amount of gaseous fuel can be injected into each cylinder responsive to the current throttle position to achieve optimum engine performance.

12. An engine control unit as claimed in claim 11, further comprising speed detector means for detecting the current speed of the engine, and said processor means also employs current engine speed to calculate said percent full load value.

13. An engine control unit as claimed in claim 12, wherein said processor means further comprises means for calculating a required manifold absolute pressure value based on said percent full load value and the current engine speed.

14. An engine control unit as claimed in claim 13, further comprising pressure sensing means for sensing the actual manifold absolute pressure of air delivered to the engine, and providing a feedback signal to the processor means indicative of the actual manifold absolute pressure.

15. An engine control unit as claimed in the claim 14 wherein the engine is turbocharged and the control unit further comprises a boost pressure control valve for controlling the boost pressure of air delivered to the engine responsive to a control signal from the processor means, said control signal being generated based on a comparison of the calculated required manifold absolute pressure and the sensed actual manifold absolute pressure.

16. An engine control unit as claimed in claim 15, wherein said processor means further comprises means for calculating a percent allowable load (PAL) value based on the calculated values of the required manifold absolute pressure (MAP) and the PFL.

17. An engine control unit as claimed in claim 16, wherein said means for calculating the PAL value for the engine employs the following formula:

$$PAL = \left( \frac{\text{actual } MAP - \text{minimum } MAP}{\text{required } MAP - \text{minimum } MAP} \right) \times PFL$$

wherein minimum MAP=representative value of MAP at PFL=0, and the term in brackets is clipped to be <1.00.

18. An engine control unit as claimed in claim 17, wherein the processor means calculates the injector ON time (IOT) using the calculated values of PAL and the current engine speed.

19. An engine control unit as claimed in claim 18, further comprising gas pressure and gas temperature detectors for detecting the pressure and temperature of gaseous fuel delivered to the engine respectively, and said processor means employs the detected gas pressure and temperature in calculating the injector ON time.

* * * * *